US010581286B2

(12) United States Patent
Ishikawa et al.

(10) Patent No.: US 10,581,286 B2
(45) Date of Patent: Mar. 3, 2020

(54) PERMANENT-MAGNET-EMBEDDED ELECTRIC MOTOR AND COMPRESSOR

(71) Applicant: Mitsubishi Electric Corporation, Tokyo (JP)

(72) Inventors: Atsushi Ishikawa, Tokyo (JP); Masahiro Nigo, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 249 days.

(21) Appl. No.: 15/557,587

(22) PCT Filed: Jun. 15, 2015

(86) PCT No.: PCT/JP2015/067205
§ 371 (c)(1),
(2) Date: Sep. 12, 2017

(87) PCT Pub. No.: WO2016/203530
PCT Pub. Date: Dec. 22, 2016

(65) Prior Publication Data
US 2018/0062462 A1 Mar. 1, 2018

(51) Int. Cl.
*H02K 1/27* (2006.01)
*F25B 31/02* (2006.01)
(Continued)

(52) U.S. Cl.
CPC ............ *H02K 1/276* (2013.01); *F25B 31/02* (2013.01); *H02K 1/02* (2013.01); *H02K 29/03* (2013.01);
(Continued)

(58) Field of Classification Search
CPC .......... H02K 1/276; H02K 1/02; H02K 1/148; H02K 29/03; H02K 21/14; H02K 2201/06; H02K 2213/03; F25B 31/02
See application file for complete search history.

(56) References Cited

U.S. PATENT DOCUMENTS 7,667,363 B2 * 2/2010 Adaniya ............... H02K 1/276
 310/156.53
8,937,420 B2 * 1/2015 Yabe ..................... H02K 29/03
 310/156.53
(Continued)

FOREIGN PATENT DOCUMENTS

JP 2000-116044 A 4/2000
JP 3722126 B2 11/2005
(Continued)

OTHER PUBLICATIONS

Machine translation for JP 2009106001A of May 14, 2009.*
(Continued)

*Primary Examiner* — Emily P Pham
(74) *Attorney, Agent, or Firm* — Posz Law Group, PLC

(57) ABSTRACT

A rotor of a permanent-magnet-embedded electric motor includes an annular rotor core having a plurality of magnet insertion holes formed in a circumferential direction, and permanent magnets inserted into the magnet insertion holes, respectively. The rotor core is formed by alternately stacking a first core block and a second core block in an axial direction of the rotor core, the first core block not having slits between each of the magnet insertion holes and a circumferential surface of the rotor core, and the second core block having the slits between each of the magnet insertion holes and the circumferential surface of the rotor core. One of the slits and one end of the permanent magnet are arrayed in a radial direction, and the other slit and the other end of the permanent magnet are arrayed in the radial direction.

7 Claims, 11 Drawing Sheets

(51) Int. Cl.
  *H02K 1/02* (2006.01)
  *H02K 29/03* (2006.01)
  *H02K 21/14* (2006.01)
  *H02K 1/14* (2006.01)
(52) U.S. Cl.
  CPC .............. *H02K 1/148* (2013.01); *H02K 21/14* (2013.01); *H02K 2201/06* (2013.01); *H02K 2213/03* (2013.01)

(56) References Cited

U.S. PATENT DOCUMENTS

| | | | |
|---|---|---|---|
| 9,496,759 | B2 | 11/2016 | Yabe et al. |
| 2013/0140922 | A1 | 6/2013 | Yabe et al. |
| 2014/0159532 | A1* | 6/2014 | Kondou ................. H02K 1/276 310/156.53 |
| 2014/0232231 | A1 | 8/2014 | Yabe et al. |
| 2015/0084468 | A1 | 3/2015 | Nigo et al. |
| 2015/0372579 | A1* | 12/2015 | Liu ........................ H02K 29/03 310/156.01 |

FOREIGN PATENT DOCUMENTS

| | | |
|---|---|---|
| JP | 2009-106001 A | 5/2009 |
| JP | 2009-219291 A | 9/2009 |
| JP | 5414900 B2 | 2/2014 |
| JP | 2014079068 A | 5/2014 |
| WO | 2013/061397 A1 | 5/2013 |
| WO | 2013-114542 A1 | 8/2013 |

OTHER PUBLICATIONS

Machine translation for JP 2009219291A of Sep. 24, 2009.*
International Search Report of the International Searching Authority dated Aug. 25, 2015 for the corresponding International application No. PCT/JP2015/067205 (and English translation).
Office Action dated Nov. 28, 2018 issued in corresponding CN patent application No. 201580079297.8 (and English translation).
Office action dated Feb. 6, 2018 issued in corresponding JP patent application No. 2017-524166 (and English machine translation thereof).
Extended European Search Report dated Dec. 7, 2018 issued in corresponding EP patent application No. 15895551.8.
Office Action dated Aug. 26, 2019 issued in corresponding EP patent application No. 15895551.8.
Office Action dated Jul. 4, 2019 issued in corresponding CN patent application No. 201580079297.8 (and English translation).

* cited by examiner

PERMANENT-MAGNET-EMBEDDED ELECTRIC MOTOR AND COMPRESSOR

CROSS REFERENCE TO RELATED APPLICATION

This application is a U.S. national stage application of International Patent Application No. PCT/JP2015/067205 filed on Jun. 15, 2015, the disclosure of which is incorporated herein by reference.

TECHNICAL FIELD

The present invention relates to a permanent-magnet-embedded electric motor in which permanent magnets are embedded in a rotor core, and a compressor that includes the permanent-magnet-embedded electric motor.

BACKGROUND

A recent increase in the awareness of energy saving demands highly efficient electric motors, and has led to many proposals for permanent-magnet-embedded electric motors achieving high efficiency by using rare earth magnets with high residual magnetic flux density and coercivity in a rotor. The permanent magnets are embedded in the rotor so as to be able to use not only magnet torque but also reluctance torque; therefore, the electric motor achieving high efficiency can be constructed. Because the reluctance torque is proportional to the difference between d-axis inductance and q-axis inductance, it is generally desired to have a structure that allows a q-axis magnetic flux to pass easily but does not allow a d-axis magnetic flux to pass easily in order to increase the reluctance torque. Here, the d axis is a radial axis passing through the center of the magnet and the q axis is an axis obtained by rotating the d axis by an electrical angle of 90°.

However, compared with a permanent-magnet-embedded electric motor not using the reluctance torque, the permanent-magnet-embedded electric motor with high usage of the reluctance torque is likely to have pulsation in a torque waveform and has an increased torque ripple. The torque ripple during operation of the permanent-magnet-embedded electric motor causes vibration and noise, and thus needs to be suppressed within a standard value.

Patent Literature 1 describes that the torque ripple is reduced by disposing a plurality of slits on the surface of a rotor in a permanent-magnet-embedded electric motor.

PATENT LITERATURE

Patent Literature 1: Japanese Patent No. 5414900

Although the permanent-magnet-embedded electric motor described in Patent Literature 1 can reduce the torque ripple by disposing the plurality of slits on the surface of the rotor, the slits block a magnetic path of a magnetic flux to cause a reduction in torque obtained at the same current. In this case, the current required to generate the same torque is increased to thus result in reduced efficiency of the electric motor due to an increased copper loss.

SUMMARY

The present invention has been achieved in view of the above and an object of the present invention is to provide a permanent-magnet-embedded electric motor that can maintain the efficiency of the electric motor by preventing a reduction in the torque obtained at the same current as well as reduce the torque ripple.

In order to solve the above problems and achieve the object, a permanent-magnet-embedded electric motor according to an aspect of the present invention includes: an annular rotor core in which a plurality of magnet insertion holes are formed along a circumferential direction; and a plurality of permanent magnets inserted into the magnet insertion holes, respectively. The rotor core is configured by alternately stacking, in an axial direction of the rotor core, a first core block and a second core block, the first core block having no slit on an outer side of each of the magnet insertion holes in a radial direction of the rotor core, the second core block having a pair of slits on the outer side of each of the magnet insertion holes in the radial direction of the rotor core, and one of the pair of slits and one end of each of the permanent magnets in the circumferential direction are arrayed in the radial direction of the rotor core, and another of the pair of slits and another end of each of the permanent magnets in the circumferential direction are arrayed in the radial direction of the rotor core.

Advantageous Effects of Invention

The present invention produces an effect where it is possible to maintain the efficiency of the electric motor by preventing a reduction in the torque obtained at the same current as well as reduce the torque ripple.

DETAILED DESCRIPTION

A permanent-magnet-embedded electric motor and a compressor according to embodiments of the present invention will now be described below in detail with reference to the drawings. Note that the present invention is not to be limited to the embodiments.

First Embodiment

Figure 1:
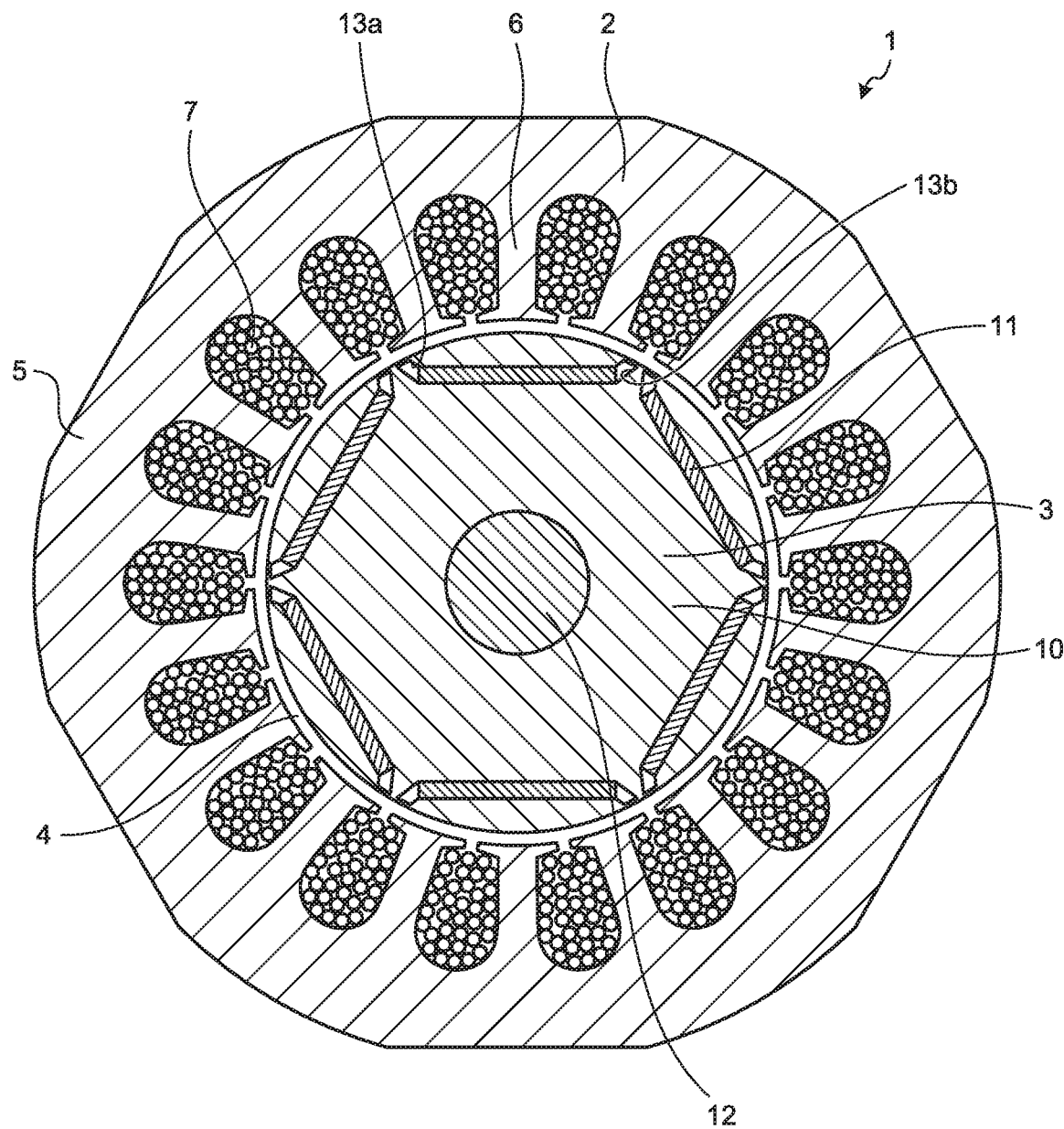
FIG. 1 is a sectional view illustrating the structure of a permanent-magnet-embedded electric motor according to a first embodiment.
Figure 2:
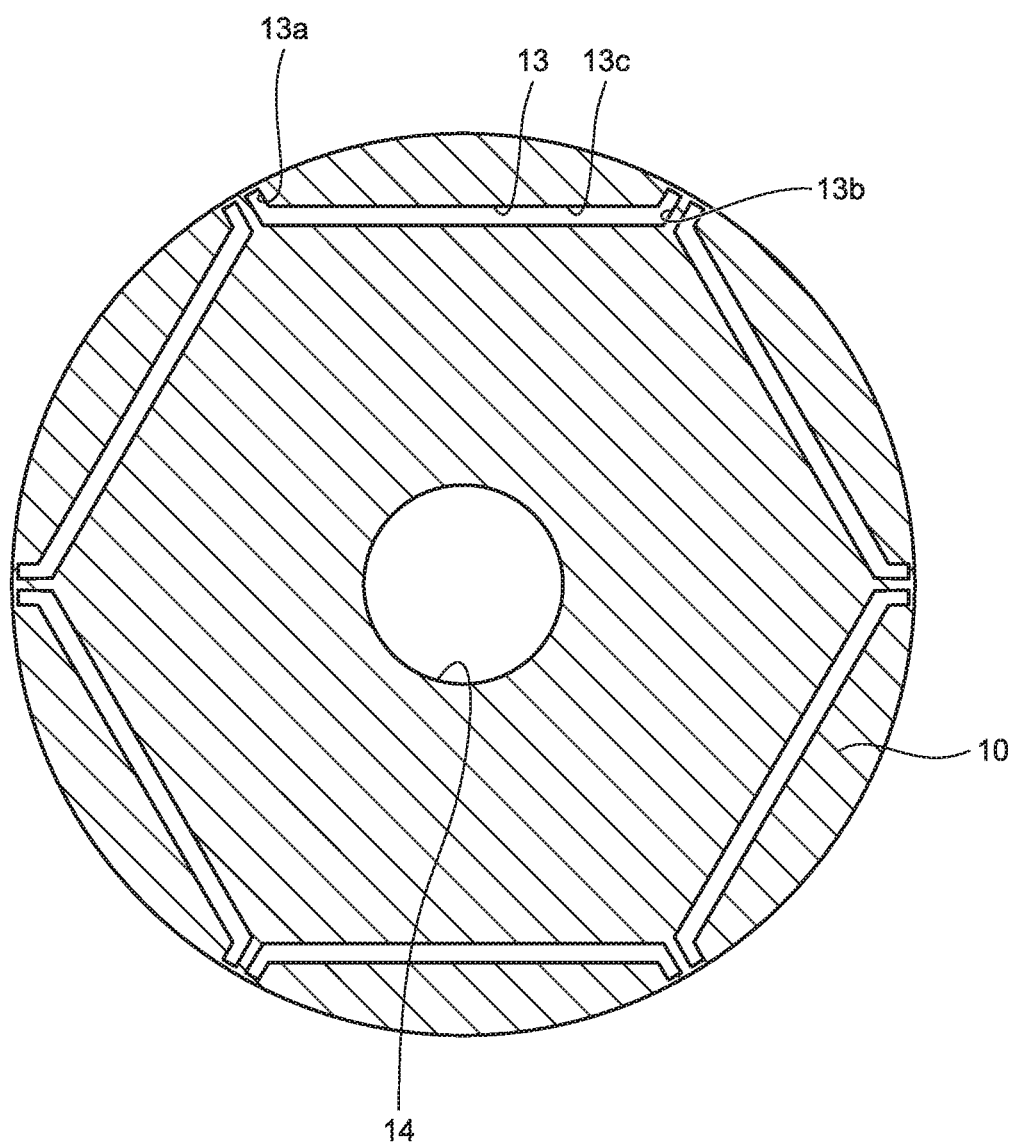
FIG. 2 is a sectional view of a rotor core according to the first embodiment.

FIG. 1 is a sectional view illustrating the structure of a permanent-magnet-embedded electric motor according to the present embodiment, and FIG. 2 is a sectional view of a rotor core according to the present embodiment. As will be described later, FIGS. 1 and 2 illustrate a sectional structure of a first core block out of the first core block and a second core block constituting the rotor core.

A permanent-magnet-embedded electric motor 1 includes an annular stator 2 and a rotor 3 disposed radially inward of the stator 2 with a gap 4 therebetween.

The stator 2 includes an annular stator core 5 and a winding 7 wound around a plurality of teeth 6 formed on the inner peripheral surface of the stator core 5. The teeth 6 are disposed at equal intervals in the circumferential direction of the stator 2 and extend in the radial direction of the stator core 5.

The winding 7 is wound by adopting distributed winding. In the distributed winding, the winding 7 is wound across the plurality of teeth 6.

The rotor 3 includes an annular rotor core 10, a plurality of permanent magnets 11 embedded in the rotor core 10, and a shaft 12 fitted in the center of the rotor core 10. The permanent magnets 11 form magnetic poles of the rotor 3, and the number of magnetic poles is equal to the number of the permanent magnets 11. The number of the permanent magnets 11 is set to six, for example, but is not limited to six as long as a plurality of magnets are provided.

A plurality of magnet insertion holes 13 are formed in the rotor core 10, where the number of the magnetic insertion holes is equal to the number of magnetic poles. The magnet insertion holes 13 are formed along the circumferential direction of the rotor 3 on the outer peripheral side of the rotor core 10. The magnet insertion holes 13 pass through the rotor core 10 in the axial direction of the rotor core 10. The permanent magnets 11 are inserted into the magnet insertion holes 13. The permanent magnet 11 has a flat plate shape, for example, and a main portion 13c of the magnet insertion hole 13 into which the permanent magnet 11 is inserted extends in a direction orthogonal to the radial direction of the rotor core 10. Note that in the following description, a "circumferential direction" refers to a circumferential direction of the rotor core 10, and a "radial direction" refers to a radial direction of the rotor core 10. The circumferential direction is also the direction of rotation of the rotor 3.

Both ends of the magnet insertion hole 13 in the circumferential direction are void portions 13a and 13b, which are disposed on both sides of the permanent magnet 11 in the circumferential direction. A direction of magnetization of the permanent magnet 11 corresponds with the radial direction. The direction of magnetization is alternately reversed in the circumferential direction. The void portions 13a and 13b are bent toward the outer periphery with respect to the main portion 13c of the magnet insertion hole 13 into which the permanent magnet 11 is inserted, and extend in the radial direction toward the outer periphery of the rotor core 10. A shaft hole 14 passing through the rotor core 10 in the axial direction is provided at the center of the rotor core 10, where the shaft 12 is press-fitted into the shaft hole 14.

The permanent magnet 11 inserted into the magnet insertion hole 13 can be a neodymium (Nd) or dysprosium (Dy)-based rare earth magnet, or a ferrite magnet composed mainly of iron oxide ($Fe_2O_3$). Because the rare earth magnet has high residual magnetic flux density and coercivity, the use of such rare earth magnet allows construction of a permanent-magnet-embedded electric motor having high efficiency and improved resistance to demagnetization. On the other hand, the ferrite magnet has residual magnetic flux density and coercivity that are one-third that of the rare earth magnet; therefore, in order to ensure the high efficiency and resistance to demagnetization similar to the case of using the rare earth magnet, the ferrite magnet being inserted has a larger volume than the rare earth magnet and is increased in size. However, the ferrite magnet is more inexpensive than the rare earth magnet and has high supply stability to thus enable construction of a permanent-magnet-embedded electric motor that is unaffected by a cost increase and a supply risk of the rare earth magnet.

Figure 3:
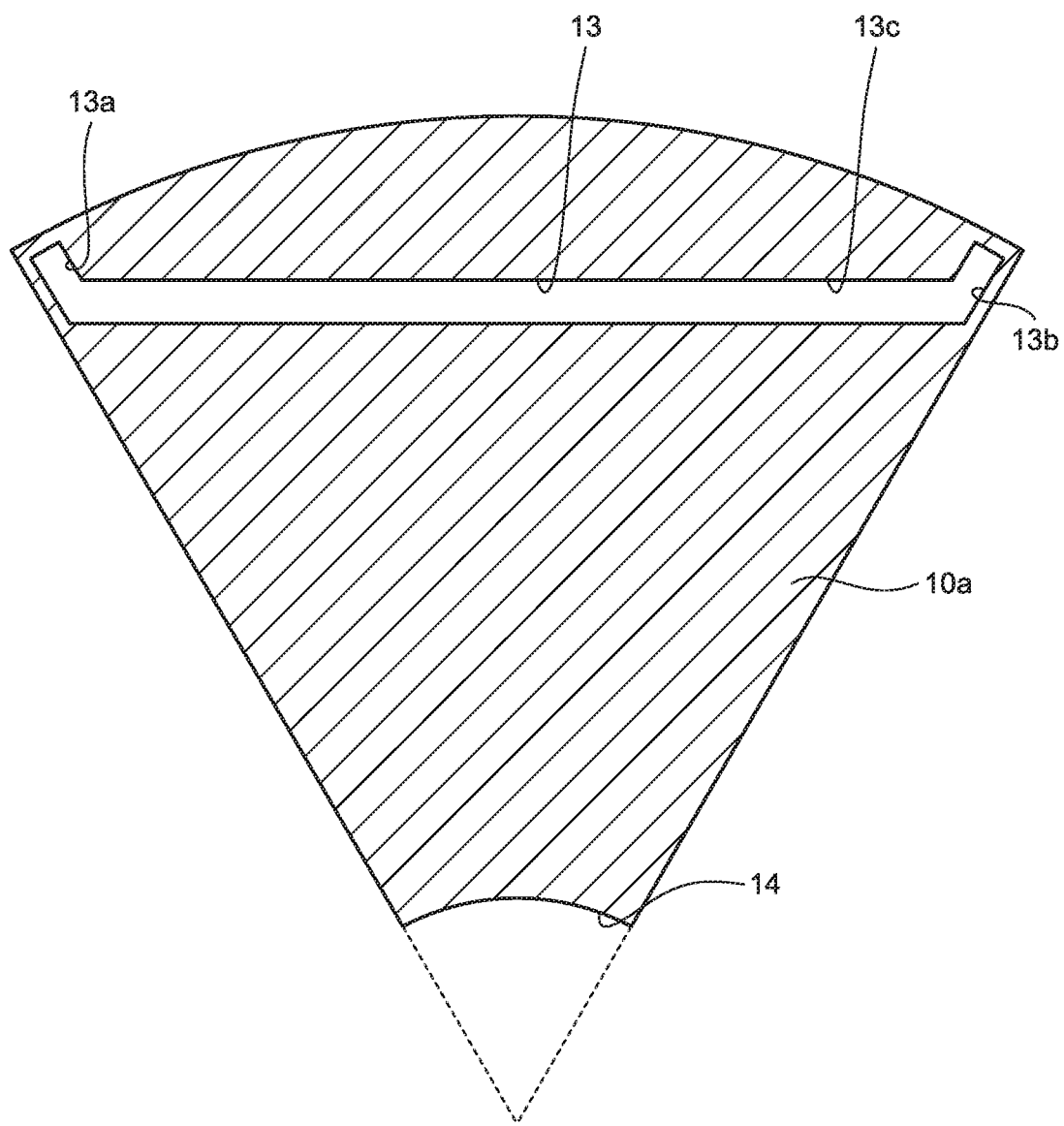
FIG. 3 is an enlarged sectional view illustrating a part of a first core block constituting the rotor core according to the first embodiment.
Figure 4:
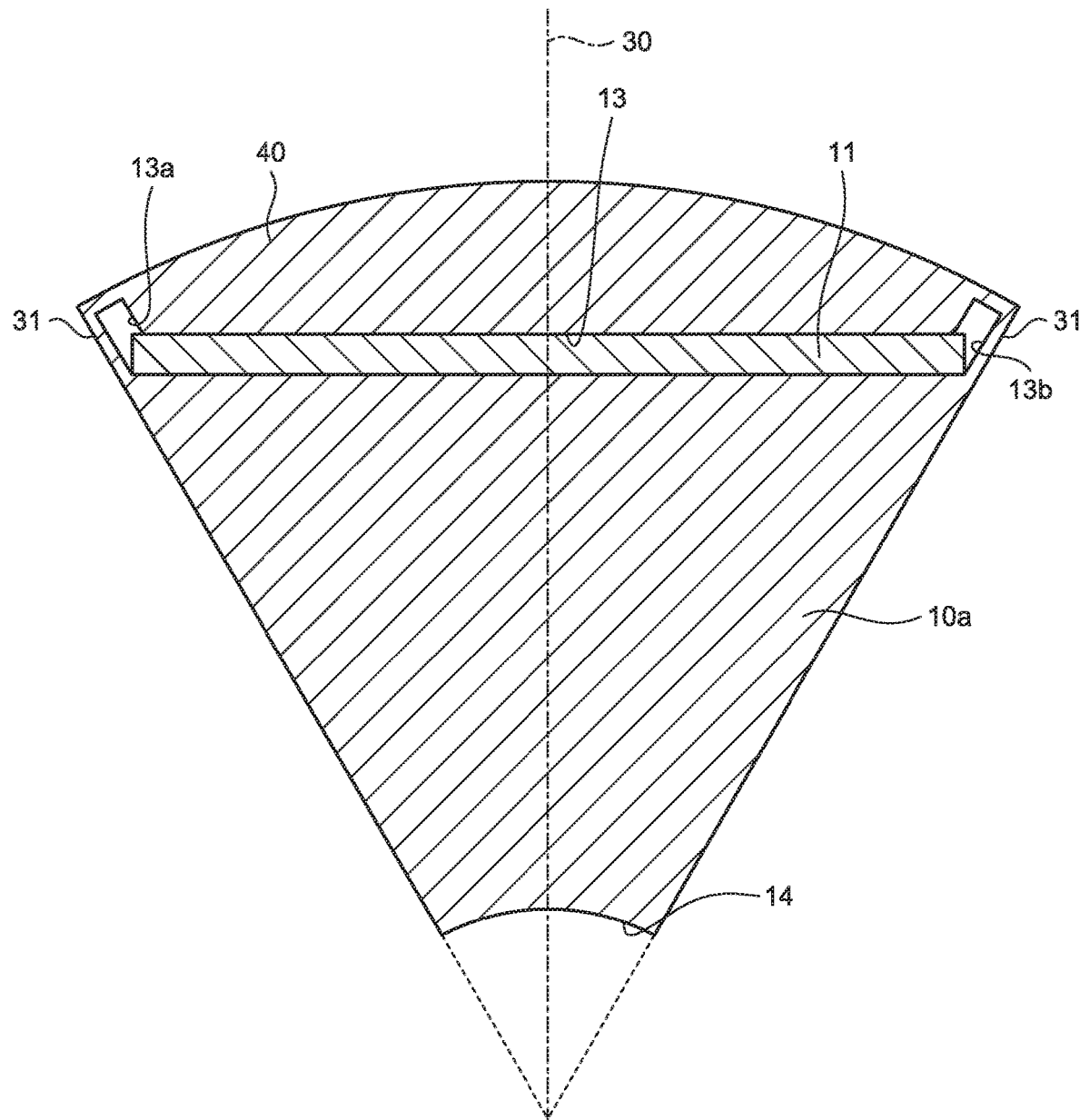
FIG. 4 is an enlarged sectional view in which a permanent magnet is inserted into a magnet insertion hole in FIG. 3.
Figure 5:
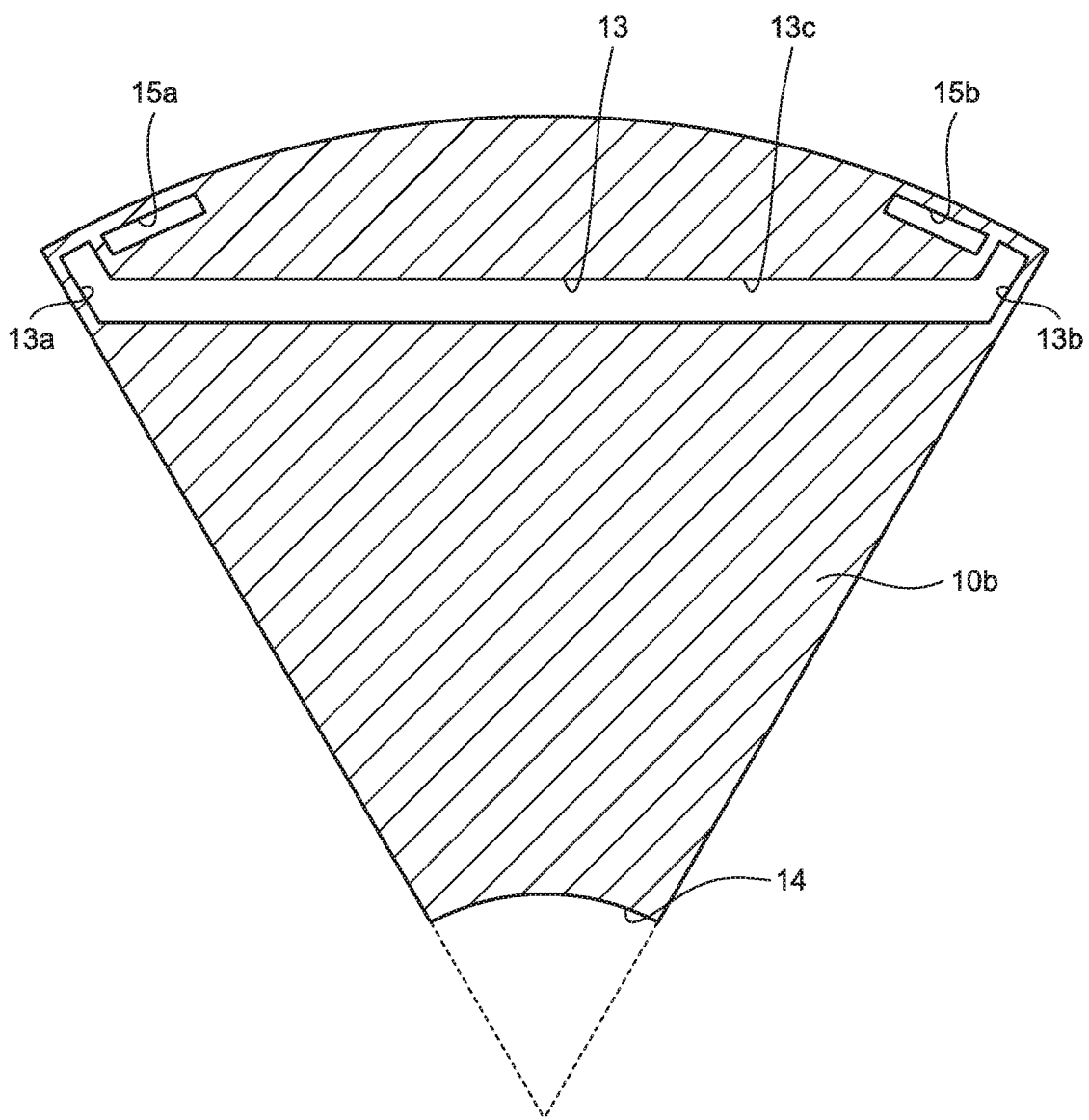
FIG. 5 is an enlarged sectional view illustrating a part of a second core block constituting the rotor core according to the first embodiment.
Figure 6:
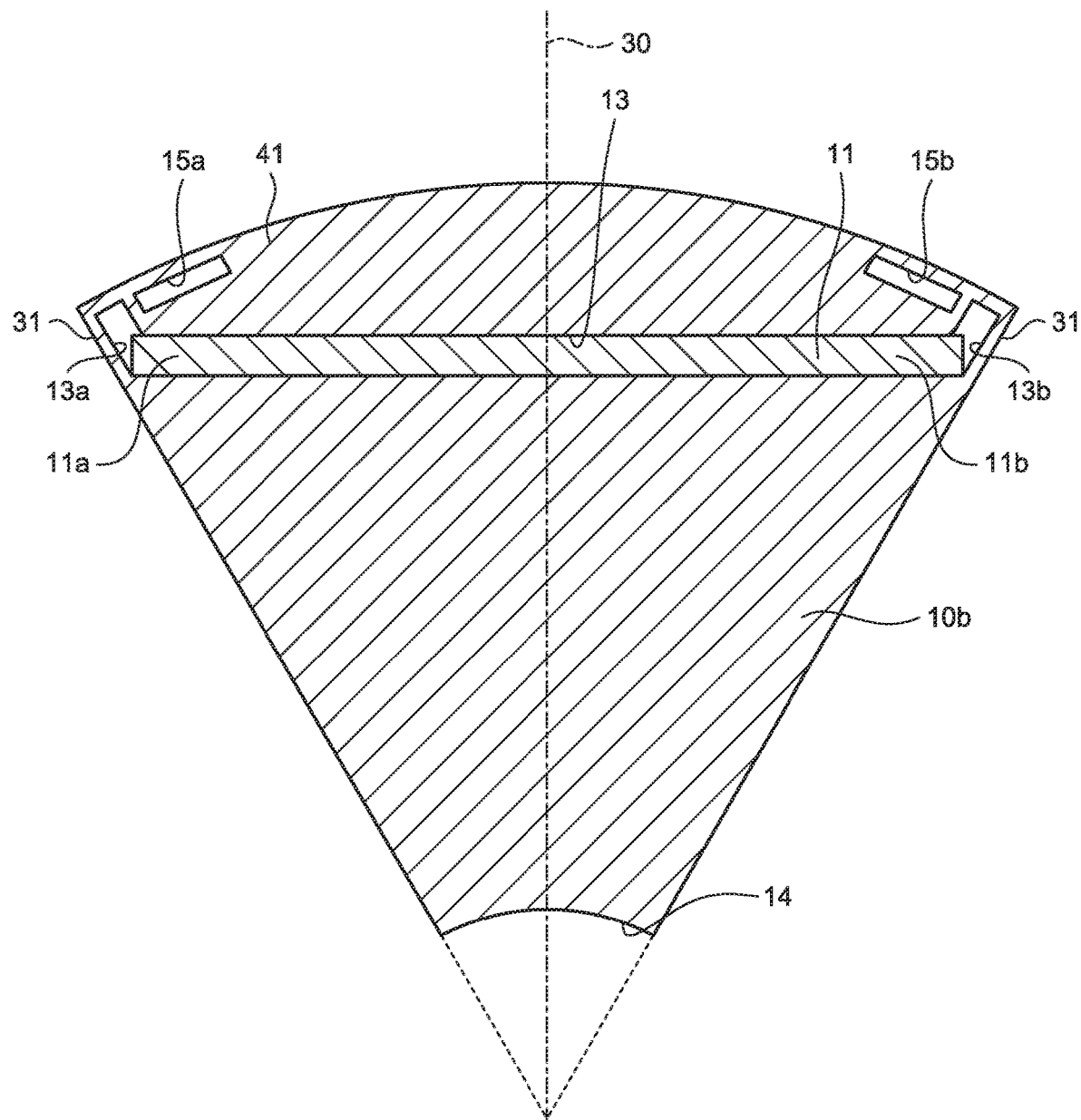
FIG. 6 is a second enlarged sectional view in which a permanent magnet is inserted into a magnet insertion hole in FIG. 5.
Figure 7:
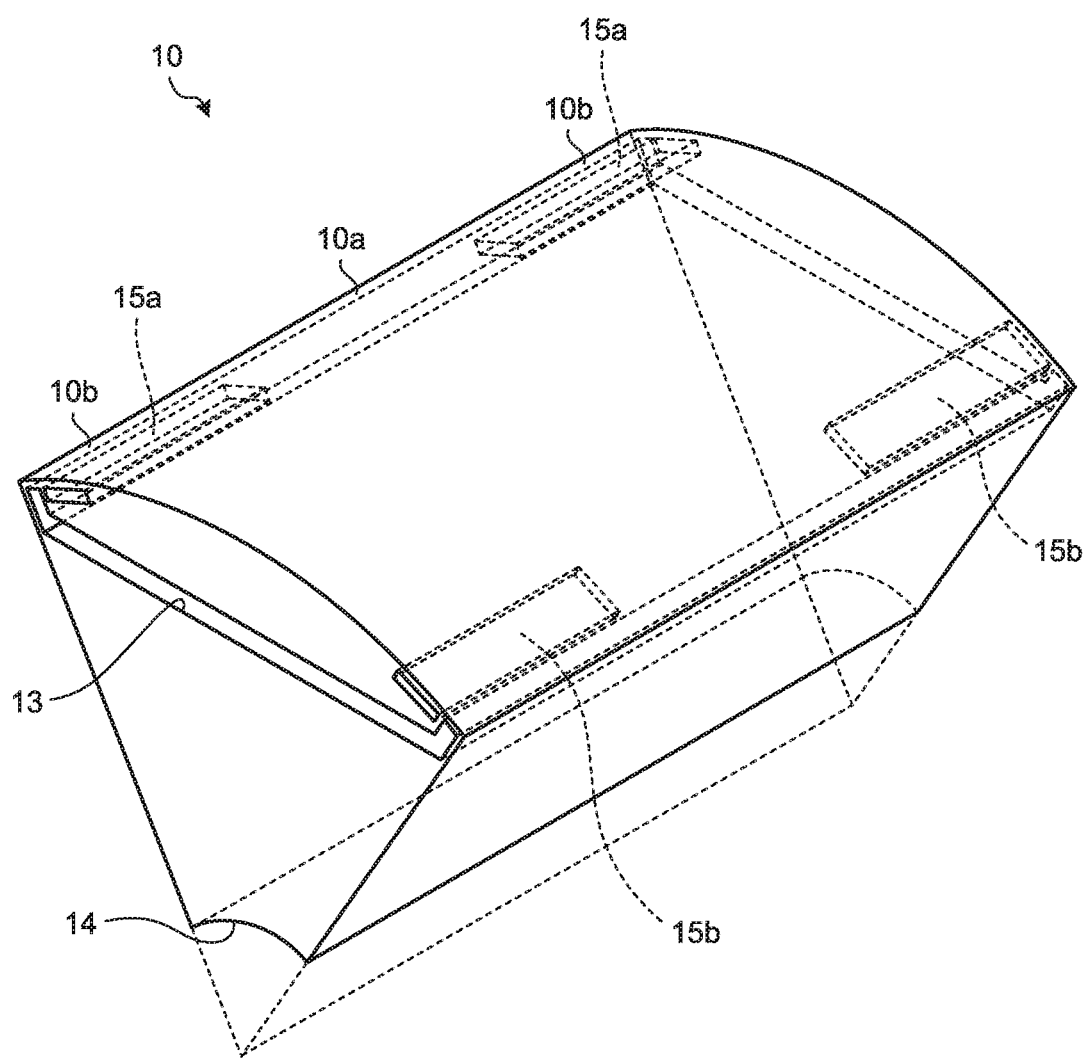
FIG. 7 is a perspective view illustrating a part of the rotor core according to the first embodiment.

FIG. 3 is an enlarged sectional view illustrating a part of the first core block constituting the rotor core of the present embodiment, and FIG. 4 is an enlarged sectional view in which the permanent magnet is inserted into the magnet insertion hole of FIG. 3. FIG. 5 is an enlarged sectional view illustrating a part of the second core block constituting the rotor core of the present embodiment, and FIG. 6 is an enlarged sectional view in which the permanent magnet is inserted into the magnet insertion hole of FIG. 5. FIG. 7 is a perspective view illustrating a part of the rotor core of the present embodiment. Note that from FIGS. 3 to 7, a component identical to that illustrated in FIGS. 1 and 2 is denoted by the same reference numeral as that assigned thereto.

FIG. 3 illustrates a sectional structure of a core block 10a, which is the first core block, corresponding to one magnetic pole. Specifically, the figure illustrates the structure for the range of a central angle of 60° with respect to the center of rotation, which is the center of the shaft hole 14 in the sectional structure illustrated in FIG. 2. FIG. 4 illustrates a state in which the permanent magnet 11 is inserted into the magnet insertion hole 13 in FIG. 3. Note that FIG. 4 illustrates a magnetic pole center 30, which is the center of the permanent magnet 11 in the circumferential direction, and an inter-magnetic pole 31, which is the middle of the adjacent magnetic pole centers 30. FIG. 4 illustrates an outer edge portion 40, which is a portion of the core block 10a on the outer side of the magnet insertion hole 13 in the radial direction.

FIG. 5 illustrates a sectional structure of a core block 10b, which is the second core block, corresponding to one magnetic pole. Specifically, the figure illustrates the structure for the range of a central angle of 60° with respect to the center of rotation, which is the center of the shaft hole 14 in the sectional structure illustrated in FIG. 2. FIG. 6 illustrates a state in which the permanent magnet 11 is inserted into the magnet insertion hole 13 in FIG. 5. Note that FIG. 6 illustrates the magnetic pole center 30, which is the center of the permanent magnet 11 in the circumferential direction, and the inter-magnetic pole 31, which is the middle of the adjacent magnetic pole centers 30.

As illustrated in FIGS. 5 and 6, the core block 10b includes a pair of slits 15a and 15b, which is a pair of gaps formed between the magnet insertion hole 13 and the circumferential surface of the core block 10b. Here, the circumferential surface of the core block 10b corresponds with the circumferential surface of the rotor core 10. The slit 15a is disposed radially outward of an end 11a, which is one end of the permanent magnet 11 in the circumferential direction, and the slit 15b is disposed radially outward of an end 11b, which is the other end of the permanent magnet 11 in the circumferential direction. That is, the slit 15a and the end 11a are arrayed in the radial direction, and the slit 15b and the end 11b are arrayed in the radial direction. Moreover, the slit 15a is disposed adjacent to the void portion 13a and is closer to the magnetic pole center 30 than the void portion 13a, and the slit 15b is disposed adjacent to the void portion 13b and is closer to the magnetic pole center 30 than the void portion 13b. Note that FIG. 6 illustrates an outer edge portion 41, which is a portion of the core block 10b on the outer side of the magnet insertion hole 13 in the radial direction. The slits 15a and 15b are located at the circumferential ends of the outer edge portion 41.

The slit 15a has a rectangular shape extending in the circumferential direction. That is, the circumferential length of the slit 15a is longer than the radial length of the slit 15a. The slit 15b has a rectangular shape extending in the circumferential direction. That is, the circumferential length of the slit 15b is longer than the radial length of the slit 15b. The slits 15a and 15b pass through the core block 10b in the axial direction.

Other structures of the core block 10b are the same as those of the core block 10a. Moreover, the stator 2 of FIG. 1 is disposed around the core block 10b in the permanent-magnet-embedded electric motor 1.

As described above, the core block 10a does not have the slits 15a and 15b on the outer side of each of the magnet insertion holes 13 in the radial direction of the rotor core 10, whereas the core block 10b has the slits 15a and 15b on the outer side of each of the magnet insertion holes 13 in the radial direction of the rotor core 10.

FIG. 7 illustrates the structure of the rotor core 10 for the angular range corresponding to one magnetic pole. As illustrated in FIG. 7, the rotor core 10 is formed by alternately stacking the core block 10a and the core block 10b in the axial direction of the rotor core 10. Specifically, the rotor core 10 is formed of the core block 10a disposed at the center in the axial direction and the pair of core blocks 10b disposed so as to sandwich the core block 10a from both sides thereof in the axial direction. One of the pair of core blocks 10b constitutes one end face of the rotor core 10, and the other of the pair of core blocks 10b constitutes the other end face of the rotor core 10.

The core block 10a is formed by punching electrical steel sheets as illustrated in FIG. 3 and stacking a plurality of the punched electrical steel sheets while crimping. Where a is the thickness of the electrical steel sheet, $l_1$ is the length of the core block 10a in the axial direction, and $n_1$ is the number of electrical steel sheets that are stacked to constitute the core block 10a, then $l_1=n_1 \times a$. Likewise, the core block 10b is formed by punching electrical steel sheets as illustrated in FIG. 5 and stacking a plurality of the punched electrical steel sheets while crimping. Where a is the thickness of the electrical steel sheet, $l_2$ is the length of the core block 10b in the axial direction, and $n_2$ is the number of electrical steel sheets that are stacked to constitute the core block 10b, then $l_2=n_2 \times a$. The total length of the core block 10b in the axial direction is given by $L_2=(l_2+l_2)=2n_2 \times a=N_2 \times a$. Here, $N_2=2n_2$ is the total number of electrical steel sheets that are stacked to constitute the core block 10b. The total length of the core block 10a in the axial direction is given by $L_1=n_1 \times a=N_1 \times a$. Here, $N_1=n_1$ is the total number of electrical steel sheets that are stacked to constitute the core block 10a.

Accordingly, the length of the rotor core 10 in the axial direction is $(L_1+L_2)$, the total length of the core block 10a in the axial direction is $L_1$, and the total length of the core block 10b in the axial direction is $L_2$. The number of electrical steel sheets stacked in the rotor core 10 as a whole is $(N_1+N_2)$, the number of electrical steel sheets stacked in the core block 10a is $N_1$, and the number of electrical steel sheets stacked in the pair of core blocks 10b is $N_2$.

Figure 8:
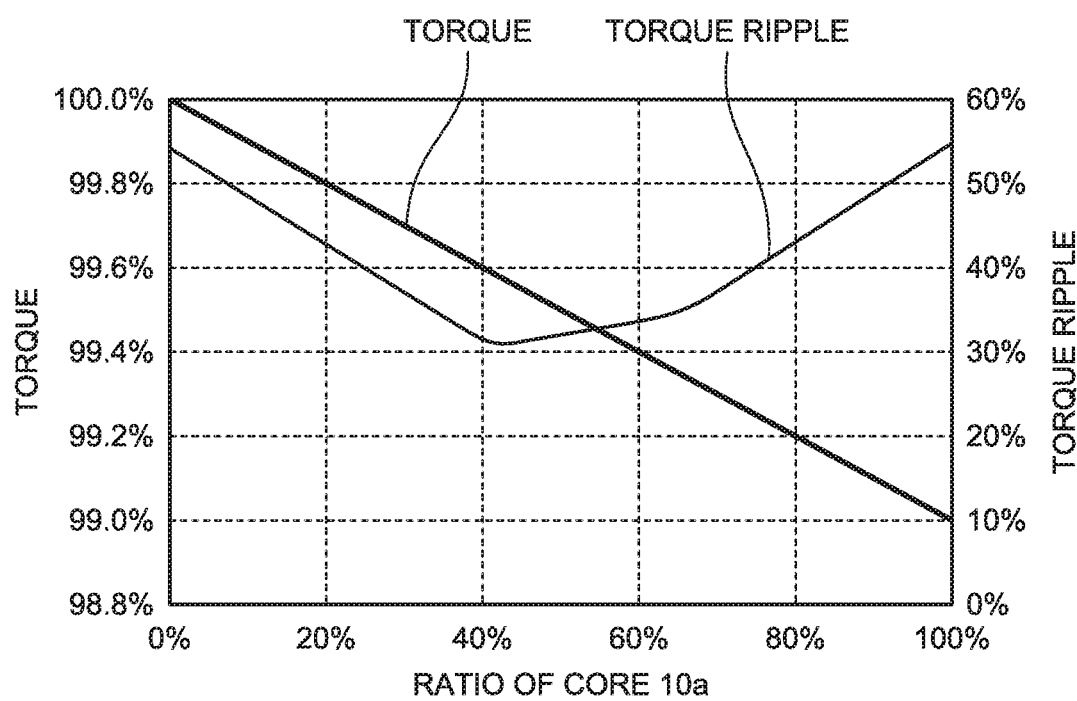
FIG. 8 is a graph illustrating the results of torque and torque ripple calculated for the same current with respect to the ratio in an axial direction of the first core block in the rotor core according to the first embodiment.

FIG. 8 is a graph illustrating the results of torque and torque ripple calculated for the same current with respect to the ratio in the axial direction of the first core block in the rotor core according to the present embodiment. That is, the horizontal axis represents $L_1/(L_1+L_2)$, which is the ratio of the total length of the core block 10a in the axial direction to the length of the rotor core 10 in the axial direction. Since $L_1/(L_1+L_2)=N_1/(N_1+N_2)$, the horizontal axis also represents the ratio of the total number of electrical steel sheets stacked in the core block 10a to the number of electrical steel sheets stacked in the rotor core 10 as a whole. The vertical axis represents the torque or torque ripple.

As illustrated in FIG. 8, the torque ripple has the smallest value when the ratio of the total length of the core block 10a in the axial direction to the length of the rotor core 10 in the axial direction falls within the range of 35 to 45%, i.e., $0.35 \leq L_1/(L_1+L_2) \leq 0.45$.

On the other hand, the torque decreases monotonically as the ratio of the core block 10a increases from 0 to 100%, where the torque is 1.0% lower when the ratio of the core block 10a is 100% than when the ratio of the core block 10a is 0%. The reduction in torque can be kept within the range of 0.35 to 0.45% when the ratio of the core block 10a is in the range of 35 to 45%.

Note that the torque ripple is slightly larger when the ratio of the core block 10a is 35% than when the ratio of the core block 10a is 45%, and the torque is slightly larger when the ratio of the core block 10a is 35% than when the ratio of the core block 10a is 45%. That is, although the torque ripple is slightly larger when the ratio of the core block 10a is 35% than when the ratio of the core block 10a is 45%, the torque can be increased correspondingly to improve the efficiency of the electric motor.

In the present embodiment, the rotor core 10 is formed by stacking the core block 10a not provided with the slits 15a and 15b and the core block 10b provided with the slits 15a and 15b in the axial direction. The torque acting on the rotor core 10 in such a structure is a synthesis of the torque acting on the core block 10a and the torque acting on the core block 10b. In this case, the torque waveform of the torque acting on the core block 10a and the torque waveform of the torque acting on the core block 10b become out of phase due to the effect of the slits 15a and 15b; therefore, the peak values of the torque waveforms are cancelled out in the rotor 3 as a whole to be able to reduce the torque ripple in the electric motor during operation.

Moreover, as illustrated in FIG. 8, the effect of reducing the torque ripple can be maximized by forming the rotor core 10 so as to satisfy $0.35 \leq L_1/(L_1+L_2) \leq 0.45$ or $0.35 \leq N_1/(N_1+N_2) \leq 0.45$.

Furthermore, as illustrated in FIG. 8, the reduction in torque can be further suppressed by forming the rotor core 10 by stacking the core block 10a and the core block 10b in the axial direction.

In the present embodiment, the slit 15a is disposed radially outward of the end 11a, which is one end of the permanent magnet 11 in the circumferential direction, and the slit 15b is disposed radially outward of the end 11b, which is the other end of the permanent magnet 11 in the circumferential direction. That is, the slit 15a and the end 11a are arrayed in the radial direction, and the slit 15b and the end 11b are arrayed in the radial direction. Such arrangement of the pair of slits 15a and 15b increases magnetic resistance at the inter-magnetic pole 31 and decreases a leakage flux passing through the inter-magnetic pole 31; therefore, the magnetic flux of the permanent magnet 11 can be used effectively.

The present embodiment provides the two slits 15a and 15b per magnetic pole. This allows the torque to be larger than when three or more slits are provided.

Note that the core block 10b can also be provided with one or three or more slits per magnetic pole. Moreover, the position, shape, and size of the slit provided in the core block 10b are not limited to the illustrated example. That is, provision of the slit in the core block 10b can obtain a torque ripple reduction effect similar to the above to one degree or another.

The present embodiment as described above can maintain the efficiency of the electric motor by preventing a reduction in the torque obtained at the same current as well as reduce the torque ripple.

The winding 7 is wound by adopting the distributed winding in the present embodiment. Compared to concentrated winding, the distributed winding is advantageous in increasing the torque at the same current because the reluctance torque can be generated effectively in addition to the magnet torque, but increases the torque ripple due to the reluctance torque. By applying the rotor 3 of the present embodiment to the stator 2 adopting the distributed winding, it is possible to construct the permanent-magnet-embedded electric motor 1 achieving high efficiency by effectively using the reluctance torque while reducing the torque ripple. Note that the winding 7 can instead adopt the concentrated winding.

Moreover, the present embodiment is provided with the void portions 13a and 13b. This prevents a short circuit of the magnetic flux at both ends of the permanent magnets 11 and allows the magnetic flux to reach the stator 2 more easily, whereby the torque can be increased. It is also possible to not include the void portions 13a and 13b.

The electrical steel sheets constituting the rotor core 10 has the same thickness in the present embodiment but need not have the same thickness. Moreover, the core blocks 10a and 10b are each formed by stacking the electrical steel sheets but may each be formed integrally.

Figure 9:
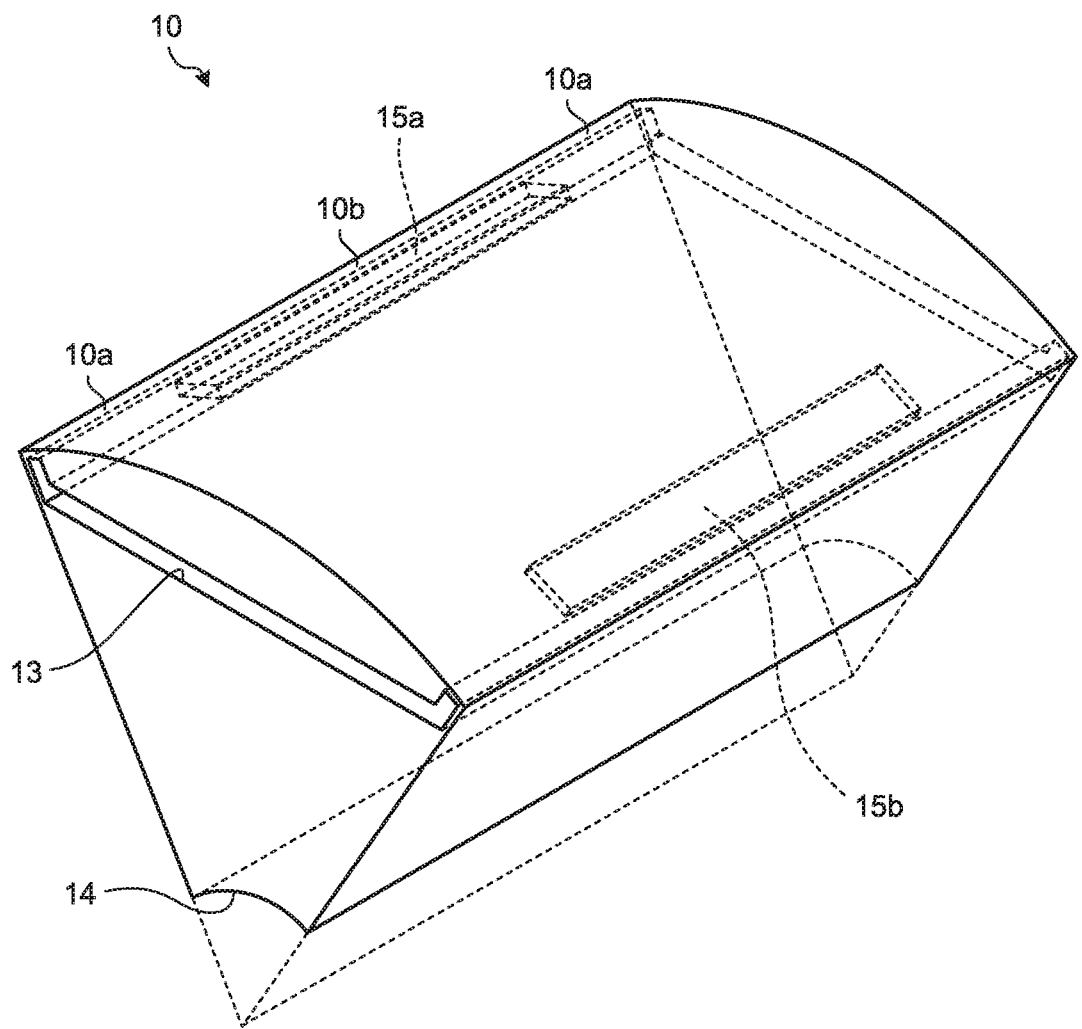
FIG. 9 is a perspective view illustrating a part of a rotor core according to a first variation of the first embodiment.

FIG. 9 is a perspective view illustrating a part of a rotor core according to a first variation of the present embodiment. As illustrated in FIG. 9, the rotor core 10 of the present variation is formed of the core block 10b disposed at the center in the axial direction and a pair of core blocks 10a disposed so as to sandwich the core block 10b from both sides thereof in the axial direction. One of the pair of core blocks 10a constitutes one end face of the rotor core 10, and the other of the pair of core blocks 10a constitutes the other end face of the rotor core 10. In this case as well, similar to the present embodiment, the torque ripple can be reduced while preventing a reduction in the torque obtained at the same current. Specifically, the effect of reducing the torque ripple can be maximized by forming the rotor core 10 so as to satisfy $0.35 \leq L_1/(L_1+L_2) \leq 0.45$ or $0.35 \leq N_1/(N_1+N_2) \leq 0.45$.

Figure 10:
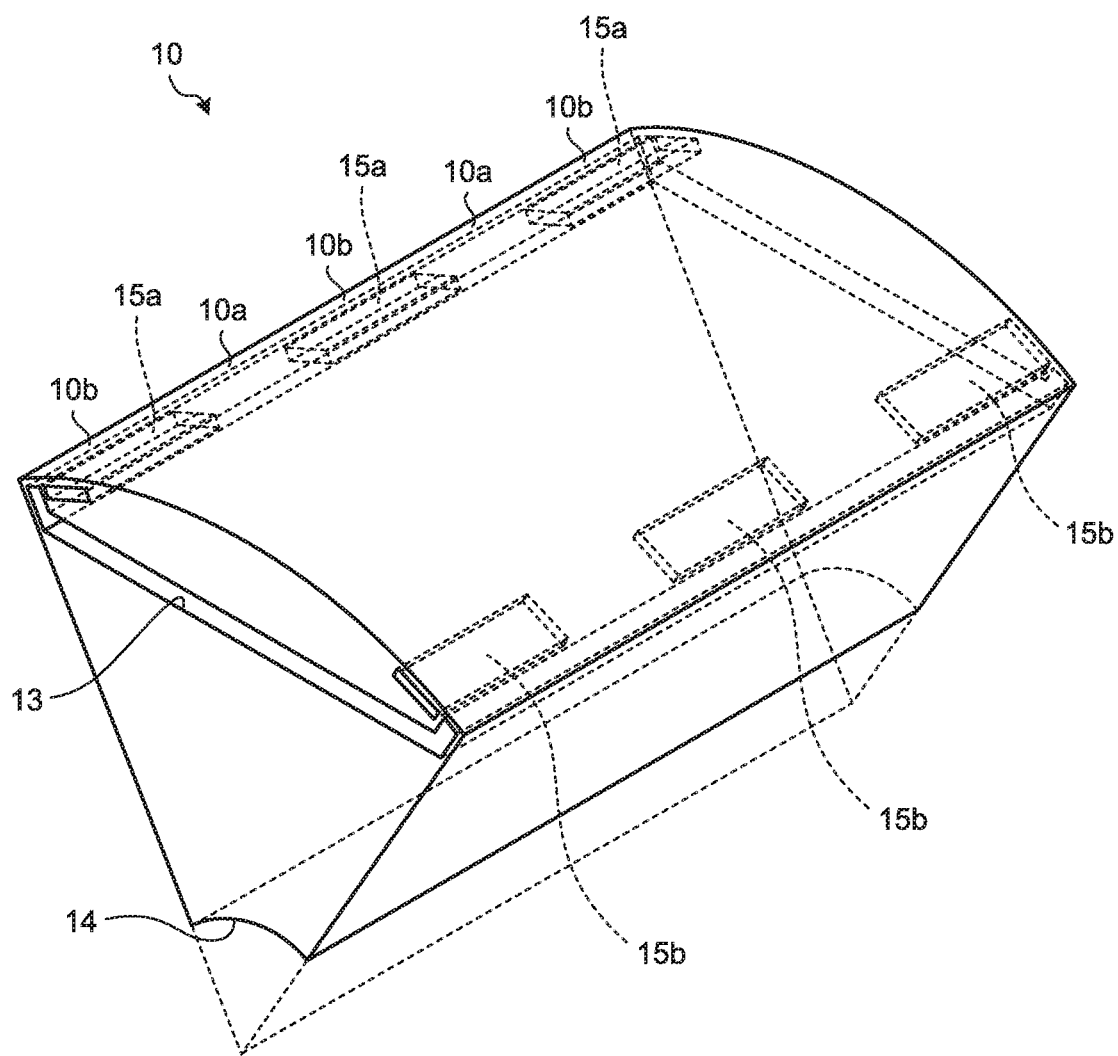
FIG. 10 is a perspective view illustrating a part of a rotor core according to a second variation of the first embodiment.

FIG. 10 is a perspective view illustrating a part of a rotor core according to a second variation of the present embodiment. As illustrated in FIG. 10, the rotor core 10 of the present variation is formed by alternately stacking the core block 10a and the core block 10b to form five layers in total. The number of the core blocks 10b is three and the number of the core blocks 10a is two in the illustrated example. One of the three core blocks 10b constitutes one end face of the rotor core 10, another one of the three core blocks 10b constitutes another end face of the rotor core 10, and the remaining one of the three core blocks 10b is disposed at the center in the axial direction of the rotor core 10. In this case as well, similar to the present embodiment, the torque ripple can be reduced while preventing a reduction in the torque obtained at the same current. Specifically, the effect of reducing the torque ripple can be maximized by forming the rotor core 10 so as to satisfy $0.35 \leq L_1/(L_1+L_2) \leq 0.45$ or $0.35 \leq N_1/(N_1+N_2) \leq 0.45$.

Note that the configuration of the rotor core 10 is not limited to the example in FIG. 7, 9, or 10, and the rotor core can be formed by alternately stacking the core block 10a and the core block 10b. The number of electrical steel sheets stacked need only be plural regardless of whether the number is even or odd. The total number of the core blocks 10a and the core blocks 10b constituting the rotor core 10 may be larger than five layers. In this case as well, similar to the present embodiment, the torque ripple can be reduced while preventing a reduction in the torque obtained at the same current. Specifically, the effect of reducing the torque ripple can be maximized by forming the rotor core 10 so as to satisfy $0.35 \leq L_1/(L_1+L_2) \leq 0.45$ or $0.35 \leq N_1/(N_1+N_2) \leq 0.45$.

Second Embodiment

Figure 11:
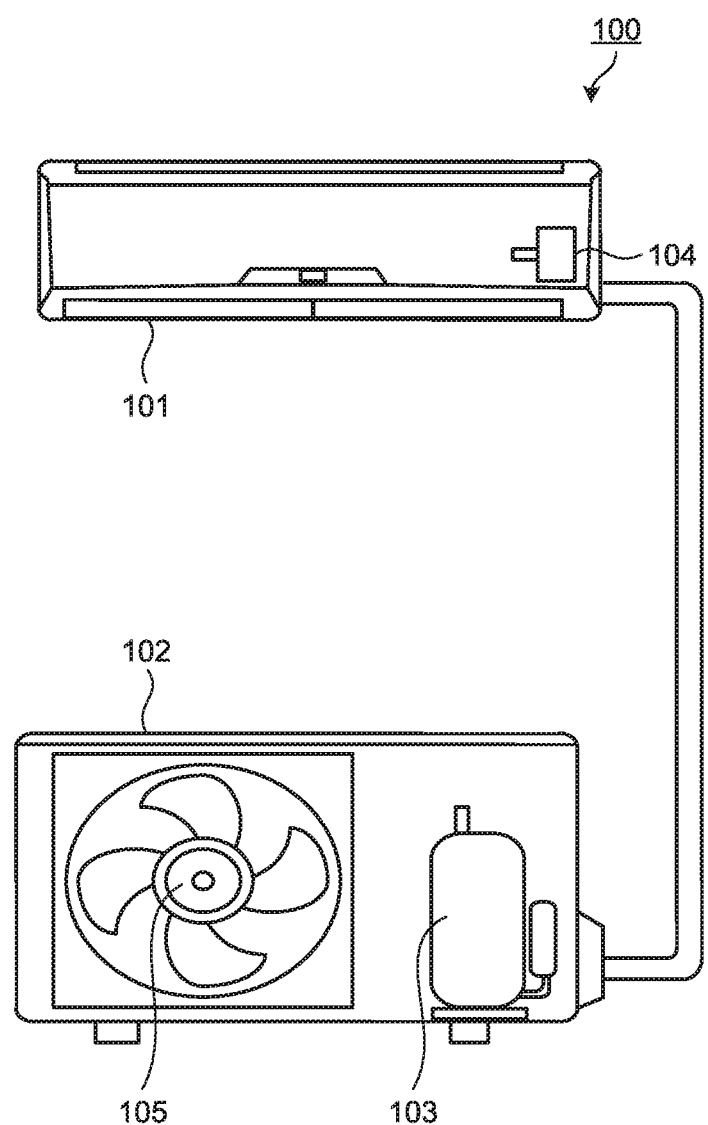
FIG. 11 is a view illustrating the structure of an air conditioner according to a second embodiment.

FIG. 11 is a view illustrating the structure of an air conditioner according to the present embodiment. An air conditioner 100 according to the present embodiment includes an indoor unit 101 and an outdoor unit 102 connected to the indoor unit 101. The outdoor unit 102 includes a compressor 103 according to the present embodiment. The compressor 103 uses the permanent-magnet-embedded electric motor 1 of the first embodiment. Note that the permanent-magnet-embedded electric motor 1 includes the first and second variations described in the first embodiment.

The air conditioner 100 is required to have energy saving performance and thus needs to be highly efficient. Moreover, in order to keep vibration and noise generated from the air conditioner 100 to be equal to or lower than the standard values, vibration and noise generated from the compressor 103 need to be reduced. The permanent-magnet-embedded electric motor 1 according to the first embodiment can reduce torque ripple while preventing a reduction in torque obtained at the same current. Therefore, the permanent-magnet-embedded electric motor 1 is applied to the compressor 103 so as to be able to construct the compressor 103 and the air conditioner 100 that can reduce the vibration and the noise caused by the torque ripple while preventing a reduction in the efficiency of the electric motor.

Note that the permanent-magnet-embedded electric motor 1 of the first embodiment can be applied not only to the compressor 103 but to each of a fan 104 of the indoor unit 101 and a fan 105 of the outdoor unit 102. In this case as well, the effect similar to that described above can be obtained.

The permanent-magnet-embedded electric motor 1 according to the first embodiment can also be applied to electrical devices other than the air conditioner, in particular to a compressor of an electrical device having a refrigeration cycle other than the air conditioner 100. In these cases as well, the effect similar to that described above can be obtained.

The configurations illustrated in the aforementioned embodiments merely illustrate examples of the content of the preset invention, and can thus be combined with another known technique or partially omitted and/or modified without departing from the gist of the present invention.

The invention claimed is:

1. A rotor comprising:
an annular rotor core in which a plurality of magnet insertion holes are formed along a circumferential direction; and
a plurality of permanent magnets inserted into the plurality of magnet insertion holes, respectively, wherein
the annular rotor core is configured by alternately stacking, in an axial direction of the annular rotor core, a first core block and a second core block, the first core block having no slit on an outer side of each of the plurality of magnet insertion holes in a radial direction of the annular rotor core, the second core block having a pair of slits on the outer side of each of the plurality of magnet insertion holes in the radial direction of the annular rotor core,
one of the pair of slits and one end of each of the plurality of permanent magnets in the circumferential direction are arrayed in the radial direction of the annular rotor core, and another of the pair of slits and another end of each of the plurality of permanent magnets in the circumferential direction are arrayed in the radial direction of the annular rotor core, and
a ratio of a total length of the first core block in the axial direction to a length of the annular rotor core in the axial direction is 0.35 or higher and 0.45 or lower.

2. The rotor according to claim 1, wherein a pair of void portions is disposed on both sides of each of the plurality of permanent magnets in the circumferential direction, the pair of void portions being both ends in the circumferential direction of each of the plurality of magnet insertion holes into which the plurality of permanent magnets are inserted, and
each of the pair of void portions extends in the radial direction of the annular rotor core toward an outer circumferential side of the annular rotor core.

3. The rotor according to claim 2, wherein
the first and second core blocks are each formed by stacking electrical steel sheets having a same thickness, and
where $N_1$ is a total number of the electrical steel sheets stacked to constitute the first core block and $N_2$ is a total number of the electrical steel sheets stacked to constitute the second core block, then $0.35 \leq N_1/(N_1+N_2) \leq 0.45$ is satisfied.

4. The rotor according to claim 1, wherein each of the pair of slits has a rectangular shape, a length of which in the circumferential direction is longer than a length in the radial direction.

5. A permanent-magnet-embedded electric motor comprising:
the rotor according to claim 1; and
an annular stator comprising a plurality of teeth around which a winding is wound, wherein
the winding is wound around the teeth by adopting distributed winding.

6. A compressor comprising the permanent-magnet-embedded electric motor according to claim 5.

7. An air conditioner comprising the compressor according to claim 6.

* * * * *